(12) United States Patent
Wei

(10) Patent No.: US 6,674,496 B2
(45) Date of Patent: Jan. 6, 2004

(54) LIQUID CRYSTAL DISPLAY DEVICE

(75) Inventor: Chung-Kuang Wei, Kao-Hsiung Hsien (TW)

(73) Assignee: Chi Mei Optoelectronics Corporation, Tainan Hsien (TW)

( * ) Notice: Subject to any disclaimer, the term of this patent is extended or adjusted under 35 U.S.C. 154(b) by 0 days.

(21) Appl. No.: 10/064,458

(22) Filed: Jul. 17, 2002

(65) Prior Publication Data

US 2003/0132713 A1 Jul. 17, 2003

(30) Foreign Application Priority Data

Jan. 11, 2002 (TW) ........................... 91100342 A

(51) Int. Cl.[7] ................. G02F 1/335; G09G 3/10
(52) U.S. Cl. ................ 349/63; 349/65; 349/113; 349/62; 315/169.3; 315/169.4
(58) Field of Search ............... 349/63, 65, 62, 349/64, 61, 46, 96, 104, 113; 315/169.3, 169.4

(56) References Cited

U.S. PATENT DOCUMENTS

2001/0017679 A1 * 8/2001 Ha et al. ................ 349/113
2001/0050734 A1 * 12/2001 Cornelissen et al. ........ 349/65
2003/0063243 A1 * 4/2003 Roosendaal et al. ........ 349/113

* cited by examiner

Primary Examiner—Don Wong
Assistant Examiner—Tuyet T. Vo
(74) Attorney, Agent, or Firm—Winston Hsu

(57) ABSTRACT

A liquid crystal display (LCD) device has a first side and a second side in parallel with the first side. The LCD device includes a front light source positioned on the first side of the LCD device for generating light beams, and a transflective liquid crystal panel. The transflective liquid crystal panel includes a first glass substrate located between the front light source and the second side of the LCD device, a second glass substrate located between the first glass substrate and the second side of LCD device, and a transflective layer located between the first glass substrate and the second glass substrate for reflecting and transmitting the light beams generated by the front light source. The LCD devices can display images both through the first side and through the second side.

22 Claims, 4 Drawing Sheets

Replacement sheet

Replacement sheet

US 6,674,496 B2

LIQUID CRYSTAL DISPLAY DEVICE

BACKGROUND OF INVENTION

1. Field of the Invention

The present invention relates to a liquid crystal display (LCD) device, and more particularly, to a transflective LCD device.

2. Description of the Prior Art

Due to low prices and high quality of LCD devices, the LCD device is widely applied in notebooks, PDA, mobile phones, and so on. Unlike cathode ray tubes (CRTs) and electro luminescence (EL) devices, LCD devices do not emit light beams, and accordingly they are equipped with supplemental light sources. In general, the LCD devices can be classified into reflective LCD devices, transmissive LCD devices, and transflective LCD devices. A reflective LCD device is illuminated by light beams that enter the device from the front of the device. A reflective surface (such as aluminum), placed inside the LCD device, returns light beams to illuminate the LCD device. Thus, the reflective LCD device can display images to a user in front of the LCD device. A transmissive LCD device usually has a backlight assembly disposed behind a liquid crystal layer. Light beams generated by the backlight assembly selectively penetrate the liquid crystal layer, and thus the transmissive LCD device can display images to a user in front of the LCD device. A transflective LCD device can display images both in a reflective mode and in a transmissive mode.

Please refer to FIG. 1. FIG. 1 is a schematic diagram of a prior art transflective LCD device. As shown in FIG. 1, a transflective LCD device 10 comprises an upper polarizer 12, a retardation film 14, an upper glass substrate 16, a common counter electrode 18, a liquid crystal layer 20, a transparent electrode 22, a lower glass substrate 24, a light diffusing plate 26, a reflective polarizer 28, and a backlight assembly 30. The backlight assembly 30 comprises a light source 30a, a light guide plate 30b, and a light absorbing plate 30c. One side of the backlight assembly 30 is opaque. The reflective polarizer 28 is made of a multi-layer dielectric film. Therefore, light beams are partially reflected by the reflective polarizer 28 and partially transmitted by the reflective polarizer 28.

As shown in FIG. 1, ambient light beams partially enter the transflective LCD device 10. As the ambient light beams penetrate each part of the transflective LCD device 10, they are reflected by the reflective polarizer 28. After that, the reflected ambient light beams penetrate each part of the transflective LCD device 10. As a result, the transflective LCD device 10 can display images to a user 32. The transflective LCD device 10 is operated in a reflective mode. In addition, as the ambient light beams are insufficient, the light source 30a of the backlight assembly 30 generates light beams to illuminate the transflective LCD device 10. The light beams generated by the light source 30a partially penetrate the reflective polarizer 28, and each part of the transflective LCD device 10. Finally, the transflective LCD device 10 can display images to a user 32. In this way, the transflective LCD device 10 is operated in a transmissive mode.

Through the use of the opaque backlight assembly 30 as a light source, the user 32 can see images through only one side of the transflective LCD device 10. As the transflective LCD device 10 is utilized in a mobile phone with a folding section, each side of the folding section needs a piece of the transflective LCD device 10 so that the user can see images through opposite sides of the folding section. However, the folding section with two pieces of the transflective LCD device 10 will increase volume and weight of the mobile phone.

SUMMARY OF INVENTION

It is therefore a primary objective of the claimed invention to provide a transflective LCD device so that users can see images through opposite sides of the LCD device.

According to the claimed invention, a LCD device having a first side and a second side parallel with the first side is provided. The LCD device includes a front light source positioned on the first side of the LCD device for generating light beams, and a transflective liquid crystal panel. The transflective liquid crystal panel includes a first glass substrate located between the front light source and the second side of the LCD device, a second glass substrate located between the first glass substrate and the second side of LCD device, and a transflective layer located between the first glass substrate and the second glass substrate for reflecting and transmitting the light beams generated by the front light source. When the light beams generated by the front light source are reflected by the transflective layer and then are emitted to the first side of the LCD device, the LCD device displays images through the first side in a reflective mode, and when the light beams generated by the front light source are transmitted by the transflective layer and then are emitted to the second side of the LCD device, the LCD device displays images through the second side in a transmissive mode.

It is an advantage over the prior art that the claimed invention provides a transflective LCD device including a front light system and a transflective LCD panel. A user can see images through opposite sides of the transflective LCD device. As a result, in the claimed invention, only a single transflective LCD device is required to assemble electronic products capable of displaying images through opposite sides of the transflective LCD device, such as mobile phones. Thus, production cost is reduced, and further, volume and weight of the electronic products are also reduced.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
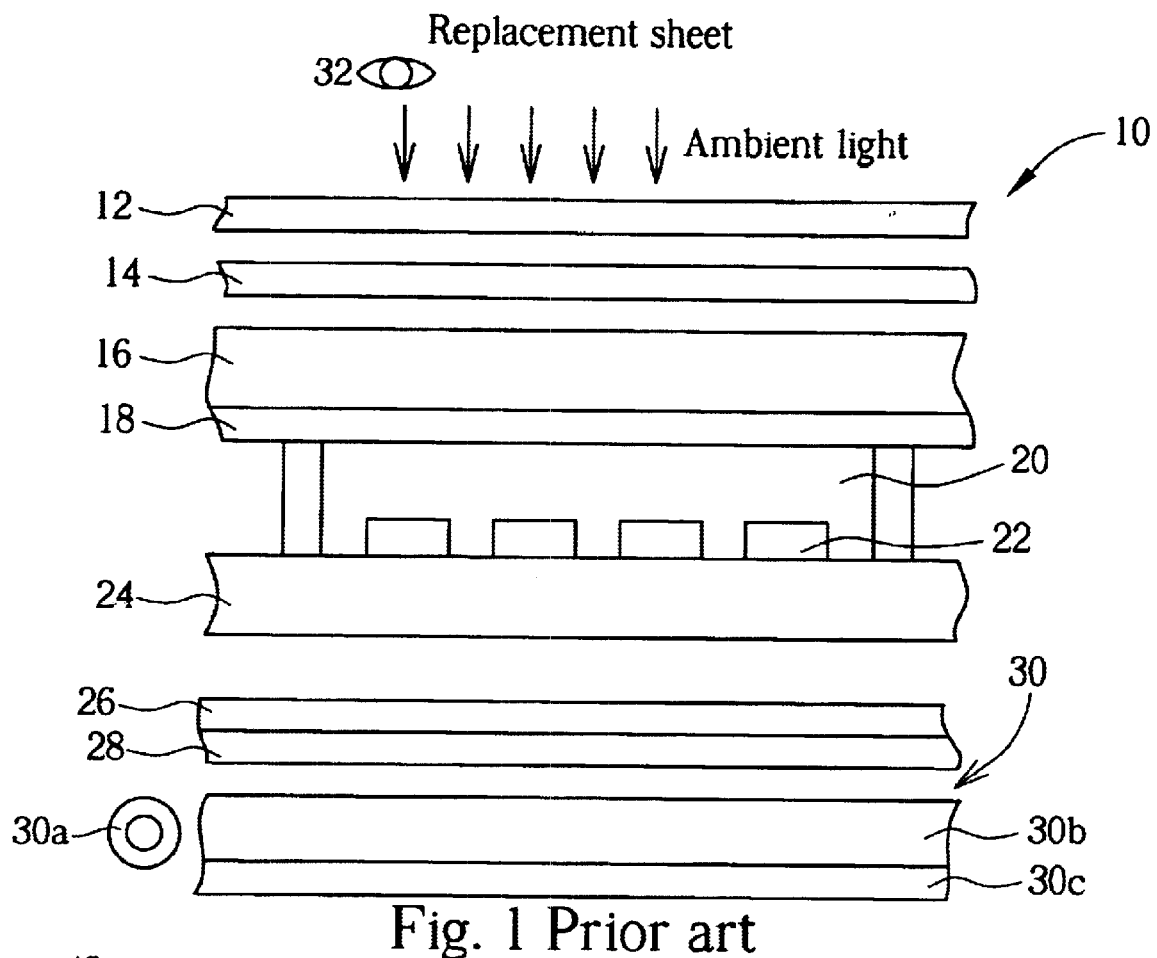
FIG. 1 is a schematic diagram of a prior art transflective LCD device.
Figure 2:
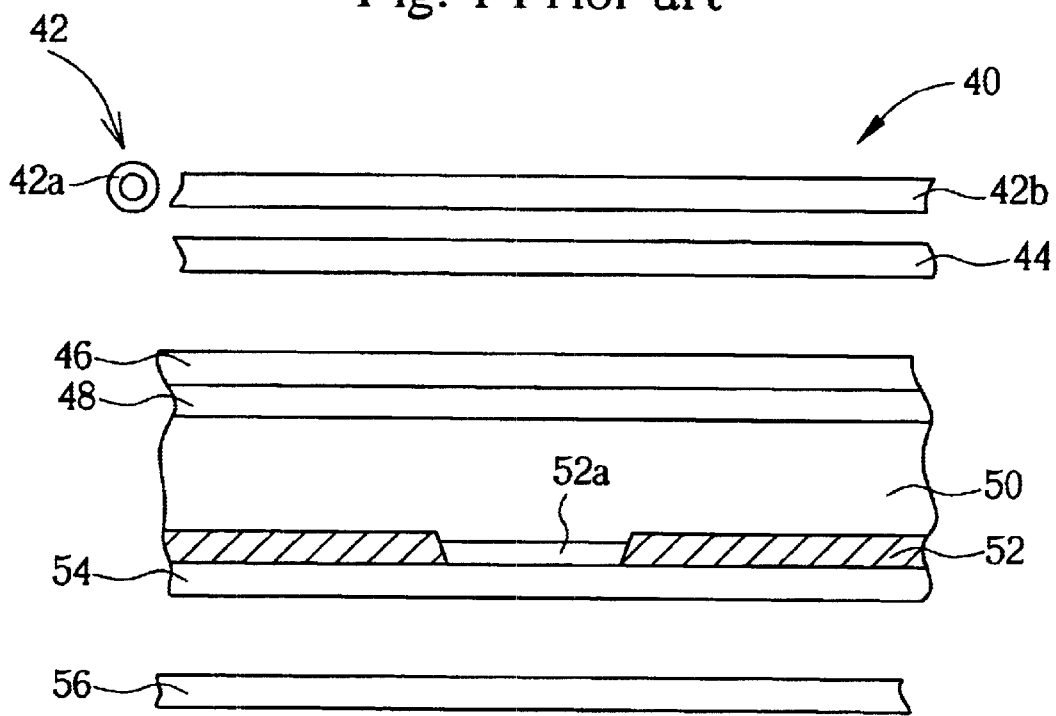
FIG. 2 is a schematic diagram of a transflective LCD device according to the present invention.

Please refer to FIG. 2. FIG. 2 is a schematic diagram of a transflective LCD device according to the present invention. As shown in FIG. 2, a transflective LCD device 40 comprises a front light system 42, an upper polarizer 44, an upper glass substrate 46, a common counter electrode 48, a liquid crystal layer 50, a metal electrode 52, a transparent electrode 52a, a lower glass substrate 54, and a lower polarizer 56. The front light system 42 comprises a light source 42a and a light guide plate 42b. Further, light beams can penetrate the front light system 42. The light source 42a, disposed on one side of the light guide plate 42b, is a cold cathode fluorescent tube. Besides, the light source 42a can also be a light emitting diode (LED). Furthermore, the upper polarizer 44 and the lower polarizer 56 comprise retardation films. The common counter electrode 48 and the transparent electrode 52a are made of a transparent conductive material, indium tin oxide (ITO). The metal electrode 52 and the transparent electrode 52a serve as a pixel electrode of a pixel and they are connected to a source electrode of a thin film transistor of the pixel.

Figure 3:
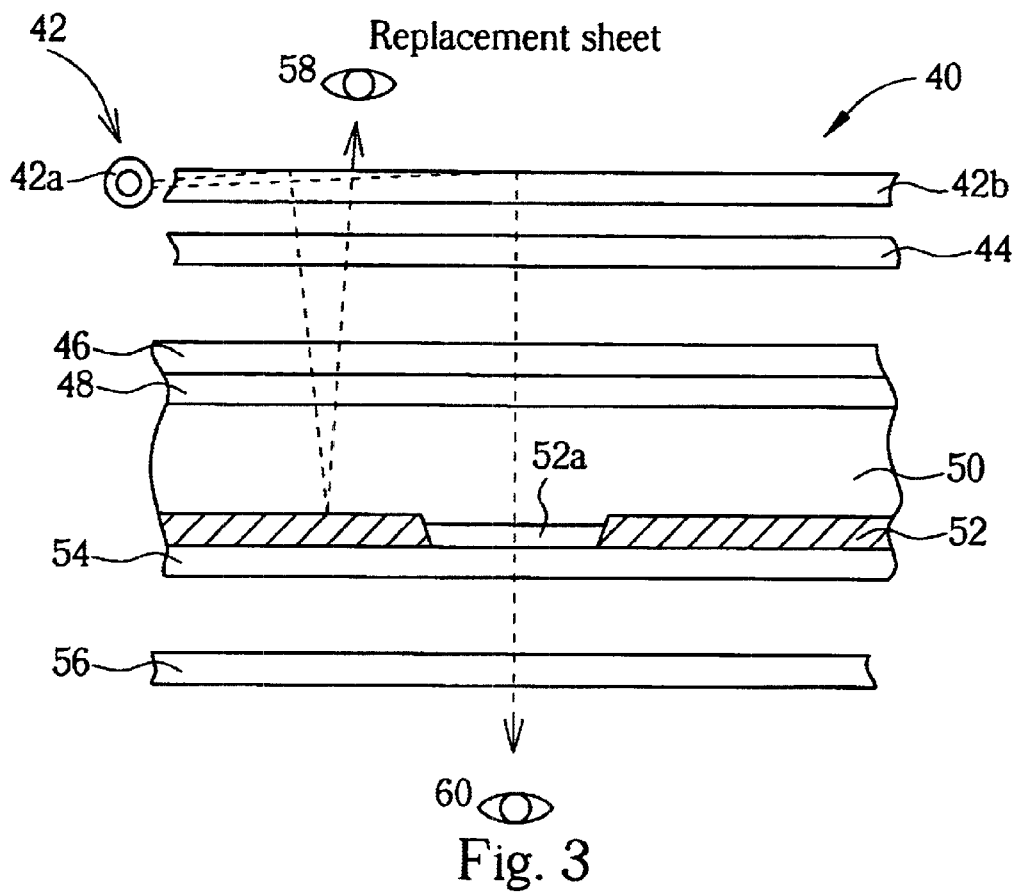
FIG. 3 is a schematic illustration of the function of the transflective LCD device according to the present invention.

Please refer to FIG. 3. FIG. 3 is a schematic illustration of the function of the transflective LCD device according to the present invention. As shown in FIG. 3, light beams generated by the light source 42a enter the upper polarizer 44 via the light guide plate 42b. The light beams are converted to linearly polarized light, which penetrates the upper glass substrate 46, the common counter electrode 48, and the liquid crystal layer 50, and then is reflected by the metal electrode 52. The reflected light beams penetrate the liquid crystal layer 50, the common electrode 48, the upper glass substrate 46, the upper polarizer 44, and the light guide plate 42b. Accordingly, the LCD device 40 displays images to a user 58 in a reflective mode. In addition, light beams generated by the light source 42a enter the upper polarizer 44 via the light guide plate 42b. The light beams are converted to linearly polarized light, which penetrates the upper glass substrate 46, the common counter electrode 48, and the liquid crystal layer 50, and then is transmitted by the transparent electrode 52a. The transmitted light beams penetrate the lower polarizer 56. Accordingly, the LCD device 40 displays images to a user 60 in a transmissive mode. As mentioned above, users can see images through opposite sides of the LCD device 40. Furthermore, the upper glass substrate 46 comprises a color filter, so that the LCD device 40 can display colorful images.

Figure 4:
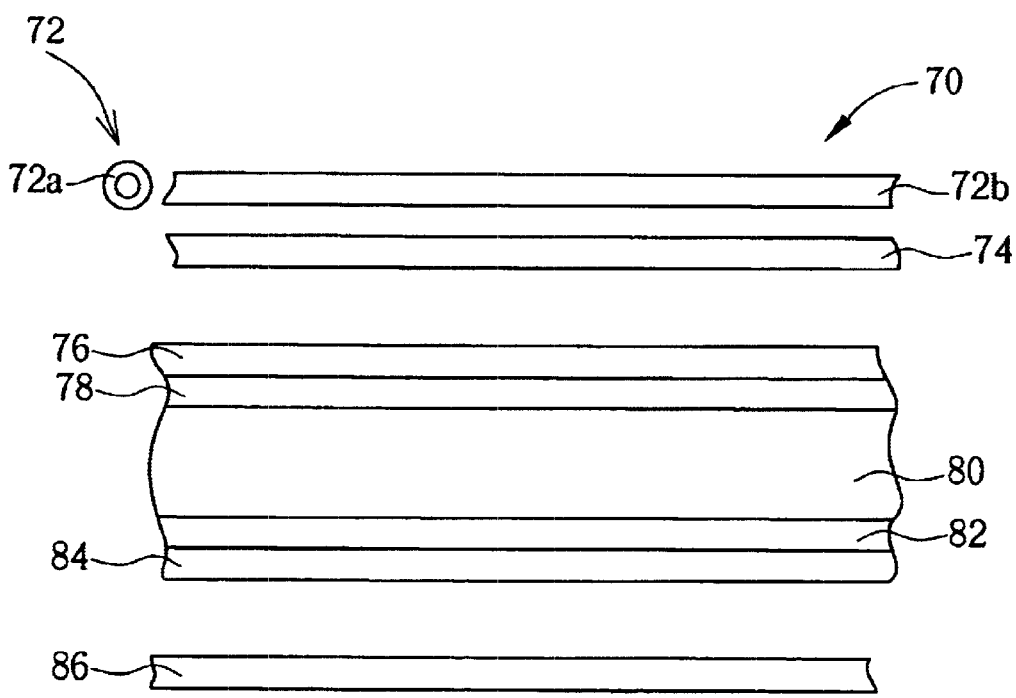
FIG. 4 is a schematic diagram of a transflective LCD device according to the second embodiment of the present invention.

Please refer to FIG. 4. FIG. 4 is a schematic diagram of a transflective LCD device according to the second embodiment of the present invention. As shown in FIG. 4, a transflective LCD device 70 comprises a front light system 72, an upper polarizer 74, an upper glass substrate 76, a common counter electrode 78, a liquid crystal layer 80, a metal electrode 82, a lower glass substrate 84, and a lower polarizer 86. The front light system 72 comprises a light source 72a and a light guide plate 72b. The common counter electrode 78 is made of a transparent conductive material, indium tin oxide (ITO). The metal electrode 82 is made of aluminum (Al) or chromium (Cr) and its thickness is several hundreds angstrom (Å). Hence, the metal electrode 82 can partially reflect and partially transmit the light beams. The metal electrode 82 serves as a pixel electrode of a pixel and it is connected to a source electrode of a thin film transistor of the pixel.

Figure 5:
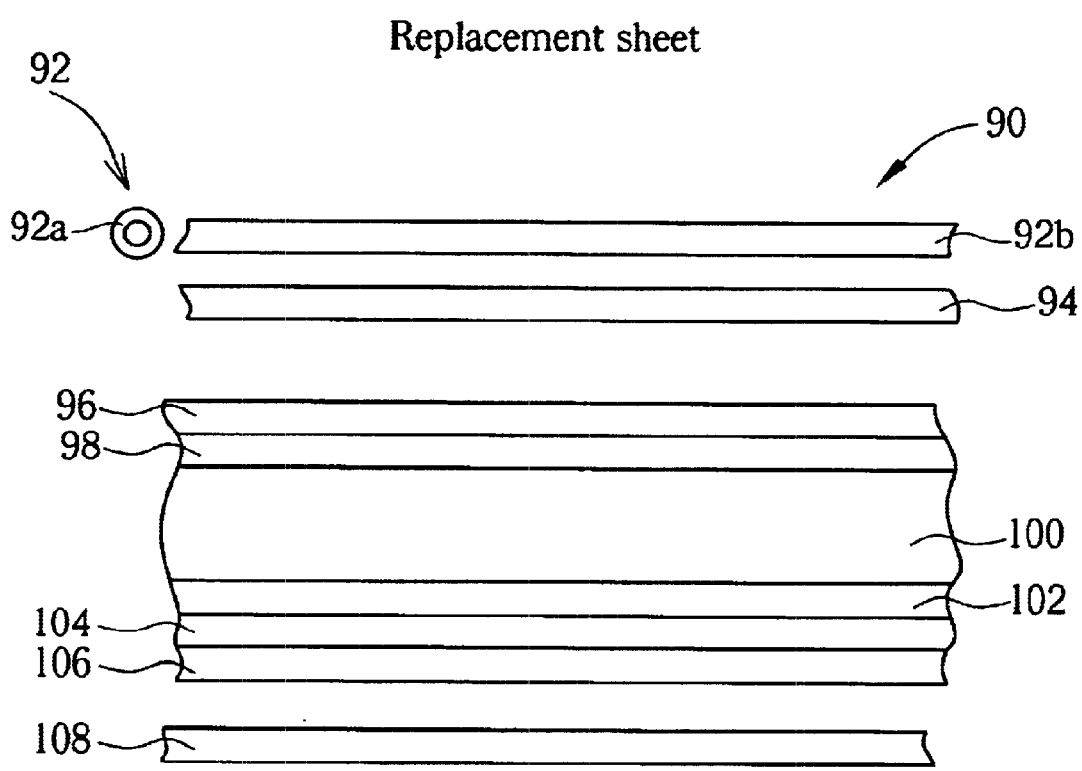
FIG. 5 is a schematic diagram of a transflective LCD device according to the third embodiment of the present invention.

Please refer to FIG. 5. FIG. 5 is a schematic diagram of a transflective LCD device according to the third embodiment of the present invention. As shown in FIG. 5, a transflective LCD device 90 comprises a front light system 92, an upper polarizer 94, an upper glass substrate 96, a common counter electrode 98, a liquid crystal layer 100, a transparent electrode 102, a multi-layer dielectric film 104, a lower glass substrate 106, and a lower polarizer 108. The front light system 92 comprises a light source 92a and a light guide plate 92b. The common counter electrode 98 and the transparent electrode 102 are made of a transparent conductive material, indium tin oxide (ITO). The transparent electrode 102 serves as a pixel electrode of a pixel and it is connected to a source electrode of a thin film transistor of the pixel. Additionally, the multi-layer dielectric film 104 can partially reflect and partially transmit the light beams. The multi-layer dielectric film 104 is comprised of two kinds of alternately laminated polymer layers, such as 2,6-polyethylene naphthalate (PEN) and 70-naphthalate/30-terephthalate copolymer (coPEN). Furthermore, the multi-layer dielectric film 104 can also be located between the lower glass substrate 106 and the lower polarizer 108.

Figure 6A:
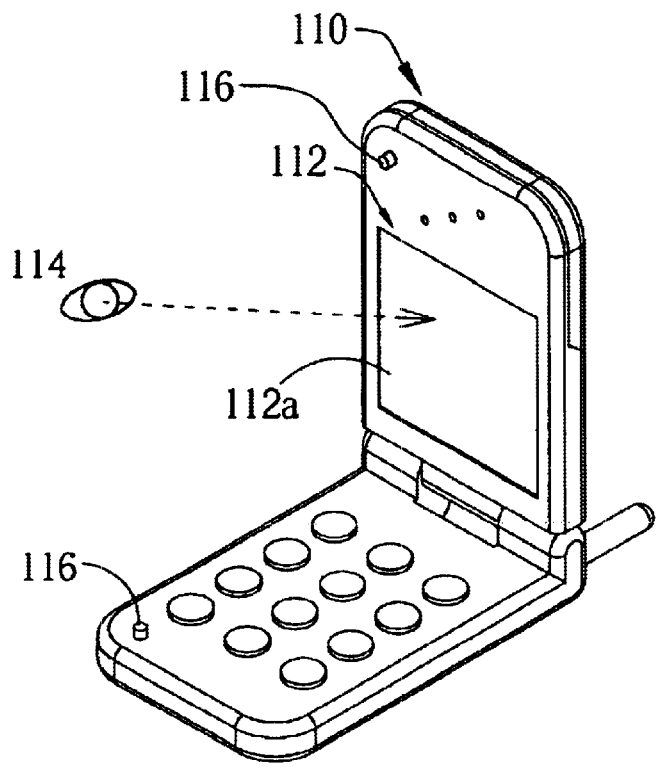
FIG. 6(A) and FIG. 6(B) are schematic diagrams of a mobile phone with the transflective LCD device according to the present invention.
Figure 6B:
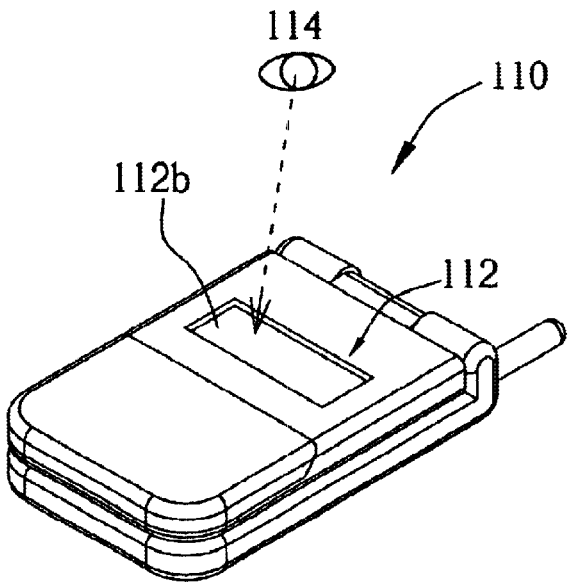

Please refer to FIG. 6(A) and FIG. 6(B). FIG. 6(A) and FIG. 6(B) are schematic diagrams of a mobile phone comprising the transflective LCD device according to the present invention. As shown in FIG. 6(A), a mobile phone 110 comprises a transflective LCD device 112 and a switching element 116. The transflective LCD device 112 is positioned in a folding section of the mobile phone 110. As the folding section is flipped up, a user 114 can see images through a front side 112a of the LCD device 112. As shown in FIG. 6(B), when the folding section is shut, the user 114 can see images through a back side 112b of the LCD device 112. The switching element 116 switches the LCD device 112 to display images between the front side 112a and the back side 112b. That is, the switching element 116 is utilized for switching between reflective and transmissive modes of the transflective LCD device 112.

Compared to the prior art, the claimed invention provides a transflective LCD device including a front light system and a transflective LCD panel. A user can see images through opposite sides of the transflective LCD device. As a result, in the claimed invention, only a single transflective LCD device is required to assemble electronic products capable of displaying images through opposite sides of the transflective LCD device, such as mobile phones. Thus, production cost is reduced, and volume and weight of the electronic products are also reduced.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A liquid crystal display (LCD) device having a first side and a second side parallel with the first side;
the LCD device comprising:
a front light source positioned on the first side of the LCD device for generating light beams; and
a transflective liquid crystal panel comprising:
a first glass substrate located between the front light source and the second side of the LCD device;
a second glass substrate located between the first glass substrate and the second side of LCD device; and
a transflective layer located between the first glass substrate and the second glass substrate for reflecting and transmitting the light beams generated by the front light source;
wherein when the light beams generated by the front light source are reflected by the transflective layer and then are emitted to the first side of the LCD device, the LCD device displays images through the first side in a reflective mode, and when the light beams generated by the front light source are transmitted by the transflective layer and then are emitted to the second side of the LCD device, the LCD device displays images through the second side in a transmissive mode.

2. The LCD device of claim 1, wherein the front light source is a cold cathode fluorescent tube.

3. The LCD device of claim 1, wherein the front light source is a light emitting diode (LED).

4. The LCD device of claim 1 further comprising a light guide plate located on the first side of the LCD device.

5. The LCD device of claim 1, wherein the transflective liquid crystal panel further comprises two polarizers respectively disposed on the first glass substrate and the second glass substrate, at least one of the two polarizers comprising a retardation film.

6. The LCD device of claim 1, wherein the transflective layer is a multi-layer dielectric film.

7. The LCD device of claim 1, wherein the transflective layer comprises a plurality of metal regions for reflecting the light beams generated by the front light source, and regions not covered by the plurality of metal regions transmit the light beams generated by the front light source.

8. The LCD device of claim 7, wherein the plurality of metal regions are composed of aluminum (Al).

9. The LCD device of claim 1, wherein the transflective layer is a metal layer.

10. The LCD device of claim 9, wherein the metal layer is composed of aluminum (Al) and chromium (Cr).

11. A liquid crystal display (LCD) device of a mobile phone having a first side and a second side parallel with the first side;

the LCD device comprising:
a front light source positioned on the first side of the LCD device for generating light beams;
a transflective liquid crystal panel comprising:
a first glass substrate located between the front light source and the second side of the LCD device;
a second glass substrate located between the first glass substrate and the second side of LCD device; and
a transflective layer located between the first glass substrate and the second glass substrate for reflecting and transmitting the light beams generated by the front light source; wherein when the light beams generated by the front light source are reflected by the transflective layer and then are emitted to the first side of the LCD device, the LCD device displays images through the first side in a reflective mode, and when the light beams generated by the front light source are transmitted by the transflective layer and then are emitted to the second side of the LCD device, the LCD device displays images through the second side in a transmissive mode; and
a switching element for switching between reflective and transmissive modes of the LCD device.

12. The LCD device of claim 11, wherein the front light source is a cold cathode fluorescent tube.

13. The LCD device of claim 11, wherein the front light source is a light emitting diode (LED).

14. The LCD device of claim 11 further comprising a light guide plate located on the first side of the LCD device.

15. The LCD device of claim 11, wherein the transflective liquid crystal panel further comprises two polarizers respectively disposed on the first glass substrate and the second glass substrate, at least one of the two polarizers comprising a retardation film.

16. The LCD device of claim 11, wherein the transflective layer is a multi-layer dielectric film.

17. The LCD device of claim 11, wherein the transflective layer comprises a plurality of metal regions for reflecting the light beams generated by the front light source, and regions not covered by the plurality of metal regions transmit the light beams generated by the front light source.

18. The LCD device of claim 11, wherein the mobile phone comprises a folding section, the LCD device being disposed on the folding section.

19. The LCD device of claim 18, wherein when the folding section is flipped up, the switching element switches the LCD device to display images in the reflective mode.

20. The LCD device of claim 18, wherein when the folding section is flipped up, the switching element switches the LCD device to display images in the transmissive mode.

21. The LCD device of claim 18, wherein when the folding section is shut, the switching element switches the LCD device to display images in the reflective mode.

22. The LCD device of claim 18, wherein when the folding section is shut, the switching element switches the LCD device to display images in the transmissive mode.

* * * * *